United States Patent
Maity et al.

(10) Patent No.: US 10,074,098 B2
(45) Date of Patent: Sep. 11, 2018

(54) DEMOGRAPHIC INFORMATION COLLECTION AND CONTENT DISPLAY BASED ON DEMOGRAPHIC INFORMATION

(71) Applicant: AMERICAN MEGATRENDS, INC., Norcross, GA (US)

(72) Inventors: Sanjoy Maity, Snellville, GA (US); Satheesh Thomas, Norcross, GA (US); Baskar Parthiban, Johns Creek, GA (US); Varadachari Sudan Ayanam, Suwanee, GA (US); Samvinesh Christopher, Suwanee, GA (US); Joseprabu Inbaraj, Suwanee, GA (US)

(73) Assignee: AMERICAN MEGATRENDS, INC., Norcross, GA (US)

( * ) Notice: Subject to any disclaimer, the term of this patent is extended or adjusted under 35 U.S.C. 154(b) by 237 days.

(21) Appl. No.: 13/890,086

(22) Filed: May 8, 2013

(65) Prior Publication Data
US 2014/0337103 A1    Nov. 13, 2014

(51) Int. Cl.
*G06Q 30/00* (2012.01)
*G06Q 30/02* (2012.01)
*G06K 9/00* (2006.01)

(52) U.S. Cl.
CPC ..... *G06Q 30/0204* (2013.01); *G06K 9/00221* (2013.01); *G06Q 30/0201* (2013.01); *G06Q 30/0251* (2013.01); *G06Q 30/0269* (2013.01)

(58) Field of Classification Search
CPC .......... G06Q 30/0204; G06Q 30/0269; G06Q 30/0251; G06Q 30/0201; G06K 9/00221
USPC .......................... 705/7.33, 14.66, 14.49, 7.29
See application file for complete search history.

(56) References Cited

U.S. PATENT DOCUMENTS

| | | | |
|---|---|---|---|
| 2007/0086623 A1* | 4/2007 | Ramaswamy et al. | 382/103 |
| 2008/0109397 A1* | 5/2008 | Sharma | G06Q 30/02 |
| 2010/0026715 A1* | 2/2010 | Garbow et al. | 345/642 |
| 2010/0306373 A1* | 12/2010 | Wormley | H04L 67/1029 709/224 |
| 2012/0150586 A1* | 6/2012 | Harper et al. | 705/7.33 |
| 2014/0122248 A1* | 5/2014 | Kuzama et al. | 705/14.66 |

OTHER PUBLICATIONS

Borut Batagelj, et al., Computer Vision and Digital Signage, In: Tenth International Conference on Multimodal Interfaces (2008) (Year: 2008).*

* cited by examiner

*Primary Examiner* — Charles Guiliano
(74) *Attorney, Agent, or Firm* — Locke Lord LLP; Tim Tingkang Xia, Esq.

(57) ABSTRACT

One aspect of the disclosure relates to a digital signage display system. In one embodiment, the digital signage display system includes: a camera configured to capture an image frame; a service processor in communication to the camera; and a digital signage display. The service processor includes a processor and a non-volatile memory storing a firmware. The firmware is configured, when executed at the processor, to process the captured image frame, detect persons in the image frame, generate a demographic-map data structure, and send the demographic-map data structure to a server system. The demographic-map data structure contains demographic information of the persons detected in the image frame. The digital signage display is configured to receive a display content provided by the server system in response to the demographic-map data structure.

17 Claims, 5 Drawing Sheets

DEMOGRAPHIC INFORMATION COLLECTION AND CONTENT DISPLAY BASED ON DEMOGRAPHIC INFORMATION

FIELD

The present disclosure generally relates to demographic information collection and content display based on the collected demographic information, and more particularly to service processors associated with digital signage displays and that collect viewer demographic information as well as a content management system of the digital signage displays that utilize the collected demographic information.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Signage display devices are widely used to deliver contents in the information broadcasting and advertising areas. Traditionally, signage displays include static display on billboard. Static signage displays may not be easily replaced, and their displays are not flexible and their contents are fixed. With modern technology particularly in the large LED/LCD display area, digital signage displays are currently widely used due to their easy-to-replace characteristics, high efficiencies, relatively low costs, flexible display contents with real-time update ability. The digital signage displays can be used to show television programming, advertisements, traffic information, directional displays, menus, information, and other messages. Digital signage displays usually utilize technologies such as a matrix of lighting devices (e.g., light bulbs), LEDs, LCD, LED, plasma displays, or projected images to display content. Digital signage displays can be found in both public and private environments, including retail stores, hotels, restaurants, and corporate buildings, amongst other locations.

Therefore, heretofore unaddressed needs still exist in the art to address the aforementioned deficiencies and inadequacies.

SUMMARY

One aspect of the disclosure relates to a digital signage display system. In one embodiment, the digital signage display system includes: a camera configured to capture an image frame; a service processor in communication to the camera; and a digital signage display. The service processor includes a processor and a non-volatile memory storing a firmware. The firmware is configured, when executed at the processor, to process the captured image frame, detect persons in the image frame, generate a demographic-map data structure, and send the demographic-map data structure to a server system. The demographic-map data structure contains demographic information of the persons detected in the image frame. The digital signage display is configured to receive a display content provided by the server system in response to the demographic-map data structure.

In certain embodiments, the firmware includes: a camera control module configured to control the camera to capture the image frame; a video converter configured to convert the image frame to digital image frame data; and a demographic information collector configured to store the digital image frame data to a frame queue, to receive the demographic-map data structure from an image processing engine, and to send the demographic-map data structure to the server system. The image processing engine is configured to retrieve the digital image frame data from the frame queue, to generate the demographic-map data structure according to the digital image frame data, and to send the demographic-map data structure to the demographic information collector.

In certain embodiments, the demographic information collector is configured to store the demographic-map data structure in a data queue, and, when the data queue is full, to periodically send the demographic-map data structure in the data queue to the server system.

In certain embodiments, the demographic information collector comprises an image-processing-engine interface wherein the image-processing-engine interface defines a function to configure the image processing engine collecting information in the demographic-map data structure.

In certain embodiments, the demographic-map data structure includes personal attribute data and personal behavior data. In certain embodiments, the image processing engine is configured to generate the personal attribute data by processing the digital image frame data corresponding to one image frame, and to generate the personal behavior data by comparing the personal attribute data corresponding to a plurality of image frames.

In certain embodiments, the server system includes: a demographic information server in communication with the service processor via a network, and a content server in communication with the service processor via the network. In certain embodiments, the demographic information server is configured to receive the demographic-map data structure from the service processor, and to generate demographic information according to the demographic-map data structure, and the content server is configured to store digital media content data, to request the demographic information from the demographic information server, to generate a program list of the digital media content data according to the demographic information, and to send the program list as the display content to the digital signage display via the network.

In certain embodiments, the service processor is configured to send instructions to the demographic information server and the content server to manage the demographic-map data structure stored in the demographic information server and the digital media content data stored in the content server.

In certain embodiments, the demographic information server includes a data store configured to store the demographic information.

In certain embodiments, the content server includes: a content storage configured to store the digital media content data; and a content manager module configured to request the demographic information from the demographic information server, to generate the program list according to the demographic information, and to send the program list as the display content to the digital signage display via the network.

In certain embodiments, the network is a cloud network.

In another aspect of the disclosure, a service processor includes a processor and a non-volatile memory storing a firmware. The firmware is configured, when executed at the processor, to process an image frame captured by a camera; detect persons in the image frame; generate a demographic-map data structure, and send the demographic-map data structure to a server system. In one embodiment, the demographic-map data structure contains demographic information of the persons detected in the image frame.

In certain embodiments, the firmware includes: a camera control module configured to control the camera to capture the image frame; a video converter configured to convert the image frame to digital image frame data; and a demographic information collector configured to store the digital image frame data to a frame queue, to receive the demographic-map data structure from an image processing engine, and to send the demographic-map data structure to the server system. In certain embodiments, the image processing engine is configured to retrieve the digital image frame data from the frame queue, to generate the demographic-map data structure according to the digital image frame data, and to send the demographic-map data structure to the demographic information collector.

In certain embodiments, the demographic information collector is configured to store the demographic-map data structure in a data queue, and, when the data queue is full, to periodically send the demographic-map data structure in the data queue to the server system.

In certain embodiments, the demographic information collector includes an image-processing-engine interface. The image-processing-engine interface defines a function to configure the image processing engine collecting information in the demographic-map data structure.

In certain embodiments, the demographic-map data includes personal attribute data and personal behavior data. In certain embodiments, the image processing engine is configured to generate the personal attribute data by processing the digital image frame data corresponding to one image frame, and to generate the personal behavior data by comparing the personal attribute data corresponding to a plurality of image frames.

A further aspect of the disclosure relates to a computer-implemented method for managing a digital signage display system. In one embodiment, the method includes: capturing, by a camera, an image frame, and sending the image frame to a service processor; processing, at the service processor, the image frame; detecting, at the service processor, persons in the image frame; generating, at the service processor, a demographic-map data structure, wherein the demographic-map data structure contains demographic information of the persons detected in the image; and sending the demographic-map data structure from the service processor to a server system.

In certain embodiments, the method further includes: converting the image frame to digital image frame data; storing the digital image frame data to a frame queue; retrieving, by an image processing engine, the digital image frame data from the frame queue; generating, at the image processing engine the demographic-map data structure according to the digital image frame data; and receiving, at the service processor, the demographic-map data structure from the image processing engine.

In certain embodiments, the method further includes: storing, at the service processor, the demographic-map data structure received from the image processing engine in a data queue; and when the data queue is full, periodically sending the demographic-map data structure in the data queue to the server system.

In certain embodiments, the service processor includes an image-processing-engine interface. The image-processing-engine interface defines a function to configure the image processing engine collecting information in the demographic-map data structure.

In certain embodiments, the demographic-map data includes personal attribute data and personal behavior data. In certain embodiments, the image processing engine is configured to generate the personal attribute data by processing the digital image frame data corresponding to one image frame, and to generate the personal behavior data by comparing the personal attribute data corresponding to a plurality of image frames.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The accompanying drawings illustrate one or more embodiments of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1:
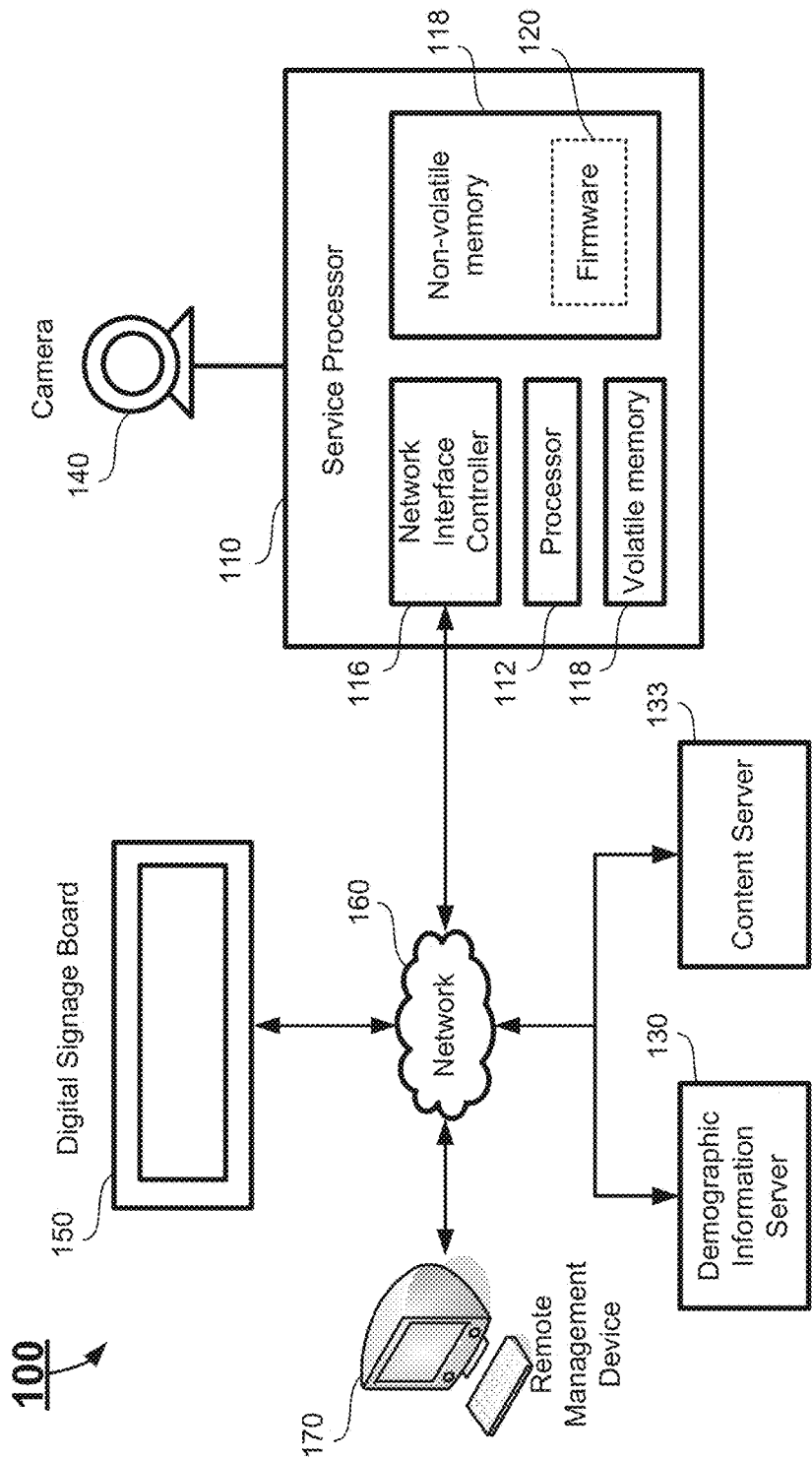
FIG. 1 schematically depicts a content management system of a digital signage system according to one embodiment of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

FIG. 1 schematically depicts a content management system for a digital signage system according to one embodiment of the present disclosure. As shown in FIG. 1, the management system 100 can include one or more service processors 110 each associated with a camera 140 and with one or more digital signage display 150, a demographic information server 130, a content server 133, and optionally a remote management device 170. The camera 140 is connected to and controlled by the service processor 110. The demographic information server 130 is connected to the service processor 110 through a network 160. The content server 133 is connected to the digital signage display 150 through the network 160. Optionally, a remote management device 170 is connected to the service processor 110 via the network 160. It should be appreciated that the management system 100 as shown of FIG. 1 only represent an exemplary embodiment of the present disclosure, and therefore should not be considered to limit the disclosure in any manner. In certain embodiments, the management system 100 may include other physical or virtual components not shown in FIG. 1.

The camera 140 is an image capturing device for capturing images of the people passing by or viewing the digital signage display 150. From now on those people are collectively referred to as the viewers unless otherwise noted. In certain embodiments, the images captured by the camera 140 are in the format of analog video, which includes one or more frames. In certain embodiments, the camera 140 can directly generate digital image frames. To capture the image of the viewers of the digital signage display 150, the camera 140 is positioned to capture images of an area where the viewers of the digital signage display 150 are generally expected. In certain embodiments, the management system 100 may include more than one camera 140. The camera 140 can be connected to a USB connector of the service processor 110 and, therefore, transmit the images either in digital format or in analog format to the service processor 110.

The service processor 110 is a controlling device to control the management system 100. As shown in FIG. 1, the service processor 110 includes a processor 112 for executing instructions, a volatile memory 114, a network interface controller 116, and a non-volatile memory 118. The service processor 110 may be a regular computer, a special purpose computer, or a specialized microcontroller capable of being installed in a computer, such as a service processor (SP) or a baseboard management controller (BMC).

The processor 112 is a host processor of the service processor 110, controlling operation and executing instructions of the service processor 110. The volatile memory 114 is a temporary memory storing information in operation, such as the instructions executed by the processor 112. For example, the volatile memory 114 may be a random-access memory (RAM). In certain embodiments, the volatile memory 114 is in communication to the processor 112 through appropriate buses or interfaces. In certain embodiments, the service processor 110 may include more than one processor 112 or more than one volatile memory 114.

The network interface controller 116 is an interface for performing network communications with the network 160. The network interface controller 116 is in communication to the processor 112 through appropriate buses or interfaces. In certain embodiments, the service processor 110 may include more than one network interface controller 116 for connecting to different networks.

The non-volatile memory 118 is a persistent memory for storing data and instructions even when not powered. For example, the non-volatile memory 118 can be a flash memory. In certain embodiments, the non-volatile memory 118 is in communication to the processor 112 through appropriate buses or interfaces. In certain embodiments, the service processor 110 may include more than one non-volatile memory 118.

As shown in FIG. 1, the non-volatile memory 118 stores a firmware 120. The firmware 120 is configured, when executed, to control the camera 140 to capture the image, and to interact with an image processing module by sending the captured image to the image processing module and receiving demographic-map data corresponding to the captured image from the image processing module. Details regarding the demographic-map data will be described below.

Figure 2:
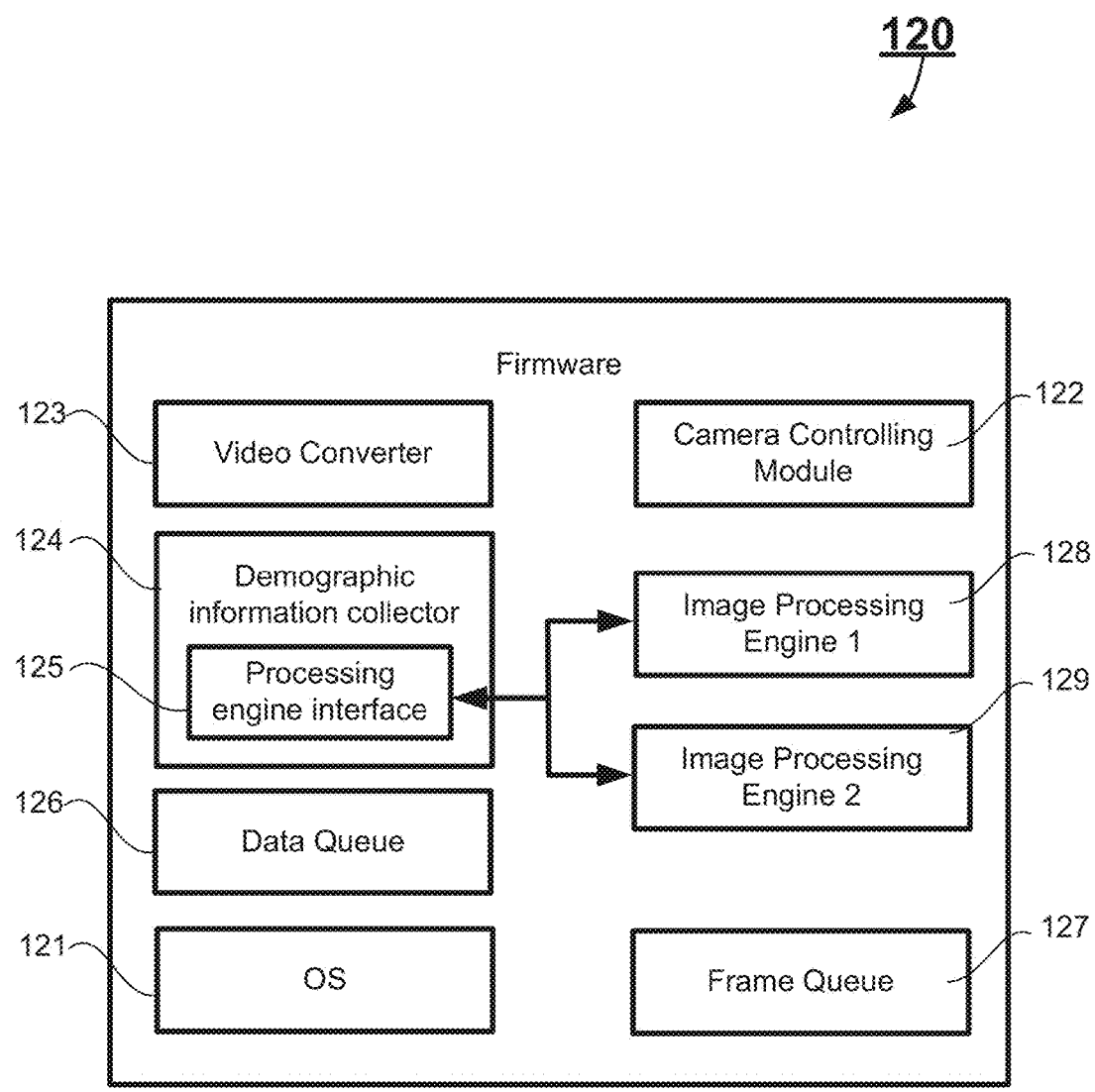
FIG. 2 schematically depicts the firmware of a service processor of the management system according to one embodiment of the present disclosure.

FIG. 2 schematically depicts the firmware 120 of the service processor of the management system according to one embodiment of the present disclosure. As shown in FIG. 2, the firmware 120 of the service processor 110 includes an operating system or kernel 121, a camera controlling module 122, a video converter 123, a demographic information collector 124, a data queue 126, a frame queue 127, and a plurality of image processing engines 128 and 129. From now on, OS refers to either an operating system or a kernel, unless otherwise noted. In certain embodiments, the firmware 120 may include other components not shown in FIG. 2.

The OS 121 can be collective management software managing the operation of the service processor 110. For example, the OS 121 can include a set of functional programs that control and manage operations of the devices connected to the service processor 110, such as the network interface controller 116, the camera 140, and other devices. The set of application programs provide certain utility software for the user to manage the service processor 110. For example, the firmware 120 may include a graphical user interface application program such that the user may change the setting of the service processor 110 through the graphical user interface. In certain embodiments, the operating system is operable to multitask, i.e., execute computing tasks in multiple threads, and thus may be any of the following: MICROSOFT CORPORATION's "WINDOWS 95," "WINDOWS CE," "WINDOWS 98," "WINDOWS 2000" or "WINDOWS NT", "WINDOWS Vista,", "WINDOWS 7," and "WINDOWS 8," operating systems, IBM's OS/2 WARP, APPLE's MACINTOSH OSX operating system, LINUX, UNIX, etc.

The camera controlling module 122 is an application program for controlling the operation of the camera 140. The camera controlling module 122 can instruct the camera 140 when (e.g., through a time schedule) to capture the videos and also set the frame rate for the video (e.g., 30 frames per second). If the camera 140 generates analog video signals, those signals are initially sent to the video converter 123.

The video converter 123 is an analog to digital (A/D) converting module for converting the frames in the analog format to digital image frame data. In certain embodiments, the video converter 123 receives the analog signals of the frames, and converts the analog signals to the digital image frame data. After the A/D conversion, the video converter 123 sends the digital image frame data to the demographic information collector 124.

The frame queue 127 is a frame data store for storing the digital image frame data. The image frames received by the firmware from the digital camera or from the video converter are initially stored in the frame queue 127. As will be described below, the image processing engine can retrieve data for an image frame from the frame queue 127 and then process that frame.

The demographic information collector 124 is a module that can process an image to determine demographic information. The demographic information collector 124 provides a framework that different image processing engines can be plugged into the collector 124 depending on the needs. For example, different imaging processing engines may use different algorithms to process an image and, thus, are suitable to generate different type of demographic information or emphasize on different efficiency factors (e.g., speed vs. accuracy). In certain embodiments, the demographic information collector 124 is configured to retrieve an image frame from the frame queue 127 and send the digital image frame data to an image processing engine 128 or 129, to receive the demographic-map data from the image processing engine 128 or 129, and to send the demographic-map data to the demographic information server 130 via the network 160. The demographic information collector 124 initiates one of the image processing engines (for example, the image processing engine 128) for processing the digital image frame data, and sets up the configuration of the image processing engine 128. The demographic information collector 124 then calls the image processing engine 128 to process the current digital image frame data and to generate the demographic-map data. When the image processing engine 128 sends back the demographic-map data, the demographic information collector 124 stores the demographic-map data in the data queue 126, and periodically sends the demographic-map data in the data queue 126 to the demographic information server 130 via the network 160. In certain embodiments, the demographic information collector 124 may send instructions to the demographic information server 130 via the network 160 to manage the demographic-map data stored in the demographic information server 130.

In certain embodiments, the demographic information collector 124 can provide the common framework for holding an image processing engine through an image-processing-engine interface 125. For example, the image-processing-engine interface 125 is an application programming interface (API). Each of the image processing engines 128 and 129 implements the functions defined by the image-processing-engine interface. The demographic information collector 124 understands the image-processing-engine interface and can invoke those implemented functions of an image processing engine once the image processing engine is linked to the demographic information collector 124.

The image-processing-engine interface 125 provides a function that the demographic information collector 124 can use to configure the image processing engine implementing the image-processing-engine interface. Through that function, the demographic information collector 124 can configure what types of demographic information it should collect. For example, the demographic information collector 124 can configure the image processing engine to collect personal attributes such as gender, age, ethnicity, height, skin color, hair color, hair length, facial hair, weight, static/in motion, accessories, stroller, glasses, beard, tie, brief-case, and suitcase information of each viewer. Further, the demographic information collector 124 can also configure the image processing engine to collect data relating to a person's behavior such as the duration at the scene (i.e, how long a person has stayed at the scene) or attentiveness (i.e., whether a person is paying attention to the content displayed at the digital signage). In certain embodiments, those configurations can be set up in a configuration file, which will be read by the image processing engine.

In certain embodiments, the image-processing-engine interface provides a function that demographic information collector can use to configure a detection level for attributes of a scene. An image processing engine implementing the image-processing-engine interface can have several different detection levels. For example, it can have 7 levels as follows: 1. No Analysis; 2. Human(s)/No Human(s); 3. Count Humans; 4. Count Humans Static vs in Motion; 5. Age: kids, youth, adult, senior; 6. Gender; man vs woman; 7. Advanced; Accessories, stroller, glasses, beard, tie, brief-case, suitcase, etc.

The image processing engine often preprocesses an image frame into features. For example, the 1st ending can run an edge detector on the image frame, and then collect features such as edge direction, edge strength, and offset from a segment center for each segment. Thus, an image frame can be reduced to a collection of features. Based on some of those features, the 1st image can detect persons in an image frame. Based on some of other features, the image processing engine can further determine the above listed personal attributes of a detected person.

The image-processing-engine interface can provide a function that demographic information collector can use to configure what features should be collected during preprocessing. The image-processing-engine interface can provide a function that demographic information collector can use to configure what features should be used to determine a personal attribute and the weight (or importance) factors of some or all the features should be applied during the determination process.

In certain embodiments, the image-processing-engine interface can provide a function that demographic information collector can use to define a category with the image processing engine and to instruct the 1st managed to determine the number of people in that category presented in the image frame currently being processed. For example, demographic information collector can define four age categories: category age 21-30, category age 31-40, category age 41-50, and category age other. The image processing engine accordingly determines the number of people in each of the categories presented in the image frame currently being processed.

The image-processing-engine interface defines a function that demographic information collector can call to pass on an image frame and then in response receive demographic-map data returned from an implementing image processing engine.

The demographic-map data includes viewer data recognized from the frames of the image. In certain embodiments, the demographic-map data includes at what time (time information) and at what location (location information) the frame was generated, and viewer information related to the persons appearing in the image. The viewer information can include scene- and personal-attribute data and personal behavior data generated. In general, the scene- and personal-attribute data can be generated by processing a single image, while the personal-behavior data can be generated by processing more than one frame. For example, the personal attribute data can relate to appearance and body features, and the personal behavior data can relate to viewers' actions observed in a period of time. Examples of the personal attribute data include gender, age, ethnicity, height, skin color, hair color, hair length, facial hair and weight. Examples of the personal behavior data include duration and attentiveness.

The data queue 126 is a data store that is used by demographic information collector to temporarily store the demographic-map data. When the image processing engine 128 sends back the demographic-map data, the demographic information collector 124 stores the demographic-map data in the data queue 126. The demographic information collector 124 can periodically remove demographic-map data in the data queue 126 and send those data to the demographic information server 130 via the network 160. In certain embodiments, the demographic information collector 124 periodically checks if the data queue 126 is full. When the data queue 126 is full, the demographic information collector 124 remove the demographic-map data in the data queue 126 and sends the data to the demographic information server 130 via the network 160.

As discussed above, the demographic information collector 124 can use an image processing engine 128 or 129 that implements the functions of the image-processing-engine interface.

Once receiving an image frame from the demographic information collector 124, the image processing engine 128 or 129 can preprocess the image frame to obtain default features (such as corner, line, edge, and center-surrounded features) or features as configured by the demographic information collector 124.

The image processing engine can use various techniques to process those features in order to detect persons in the image frame as well as the personal attributes of each person. For example, based on the needs, the image processing engine can use one or more of a naïve/normal classifier, binary decision trees, boosting techniques, random trees, a Haar classifier, and a Viola-Jones classifier. The image processing engine can adjust the weight/importance factors of some or all of the features and according to which the features are evaluated by the image processing engine to detect different attributes.

Thus, after processing each of the image frame received, the image processing engine can detect how many people appear in the image frame and the personal attributes of each of the people. Based on a default detection level or the detection level configured by demographic information collector, the detected personal attributes can include one or more of gender, age, ethnicity, height, skin color, hair color, hair length, facial hair, weight, static/in motion, accessories, stroller, glasses, beard, tie, brief-case, and suitcase information.

Further, in certain embodiments, the image processing engine may group one or more persons in a default category or a category configured by demographic information collector. For example, the image processing engine can examine the personal attributes of each person and determine which category that person should be assigned to. Thus, the 1st ending can determine the number of people in each category. The image processing engine can also use other techniques such as a k-means cluster.

In certain embodiments, the image processing engine can temporarily save each received image frame to a queue. In addition to processing the currently received image frame to generate demographic information as discussed above, the image processing engine can process the current image frame as well as several previously received image frames (now saved in the queue) together or with reference to the previously received image frames. Those image frames may or may not be consecutive image frames. By using features generated from several frames at different times, the image processing engine can trace a person's movement as well as the duration of a person at the scene. In other words, the image engine can determine whether the same person appeared in several different frames captured at different times. Further, by detecting whether a person is facing the digital signage and how long the person was facing the digital signage, the 1st ending can determine the attentiveness that person. On the other hand, if a person was facing random directions in the consecutive frames, she or he likely did not pay much attention to the information on the digital signage display.

Then, the image processing engine can use those detected information to construct a demographic-map data structure. For example, the demographic-map data structure can be a JSON object. In this example, the demographic-map data structure can include a timestamp indicating to what time the demographic-map data is directed to, a location code indicating to what location the demographic-map data is directed to, the number of people detected, and the personal attributes of each of the detected person. Further, the demographic-map data structure can also include how long each person has been at the scene and the attentiveness of each person.

Figure 3A:
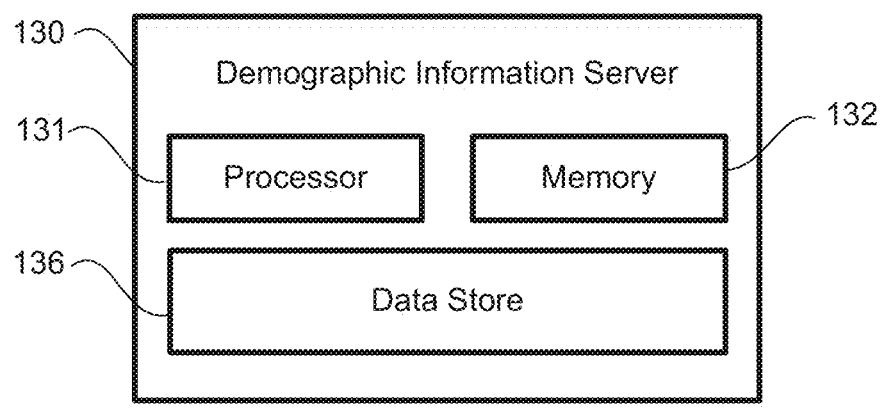
FIG. 3A schematically depicts a demographic information server according to one embodiment of the present disclosure.

The demographic information server 130 receives the demographic-map data structures from one or more service processors. Each service processor can be associated with a digital signage. FIG. 3A schematically depicts the demographic information server according to one embodiment of the present disclosure. As shown in FIG. 3A, the demographic information server 130 includes a processor 131, a memory 132, and a data store 136. In certain embodiments, the management system 100 may include more than one demographic information server 130.

After the demographic information server 130 receives a demographic-map data structure, the demographic information server 130 stores the demographic information about time and location specified in the data structure in the data store 136. By storing demographic-map data structures continuously received from multiple service processors 110 at different locations, the demographic information server eventually stores the demographic information at different locations and times. Further, the demographic information server 130 can process those data to identify any demographic patterns and trends. Based on those patterns and trends, the demographic information server 130 can further predict times and locations at which certain demographic groups (e.g., male viewers between age 30-40) will be present. In certain embodiments, the demographic information server 130 may receive instructions from the demographic information collector 124 of the service processor 110 via the network 160 to manage the demographic-map data stored in the demographic information server 130.

Figure 3B:
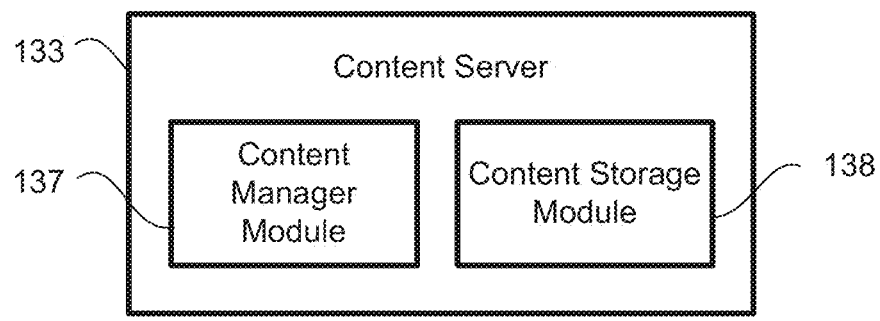
FIG. 3B schematically depicts a content server according to one embodiment of the present disclosure.

The content server 133 manages and stores contents to be delivered to and played at each digital signage display 150. FIG. 3B schematically depicts the content server according to one embodiment of the present disclosure. As shown in FIG. 3B, the content server 133 can include a content manager module 137 and a content storage module 138. The content manager module 137 manages the contents (e.g. various advertisement videos) to be displayed at each digital signage display 150. For example, the content manager module 137 can create a program list for each digital signage display 150 and deliver the program list to the digital signage display 150. The program list can specify the time for a specific content to be played at the digital signage display 150. The specific content can be identified by a content ID. The program list can also include metadata describing the content specified in the program list. For example, the metadata can describe the category of advertisement content, the format of the content, the length of the content, and the product in the advertisement. The content manager module 137 can also provide a content address (e.g., a uniform resource identifier) for each specific content (e.g. also via the program list). Using the content address, the digital signage display 150 can request and download the specific content from the content storage module 138. In this way, the digital signage display 150 can download the contents specified in the program list. The digital signage display 150 can playback the downloaded contents at the times specified in the program list. In certain embodiments, the content manager module 137 may receive instructions from the service processor 110 via the network 160 to manage the contents stored in the content storage module 138.

In certain embodiments, the content manager module 137 determines the program list based on predicted demographic information associated with the each digital signage display 150. The content manager module 137 can request demographic information from the demographic information server 130 at the location of the signage and at a specific time period. Based on the demographic information received, the content manager module 137 can choose a content for the specific time period. For example, the content manager module 137 can receive information that at the location of a digital signage display 150 in a shopping mall every Saturday between 2 PM to 4 PM, most of the viewers are male between 30 to 40 years old. Based on that information, the content manager module 137 can determine and choose a sports-car-advertisement video to be played at that signage every Saturday between 2 PM to 4 PM. Using these techniques, the content manager module 137 can determine a program list for each digital signage display 150.

The content storage module 138 is a data store for storing of the contents to be delivered to each digital signage display 150. For example, the content storage module 138 can use a mechanism that returns the content data based on a content ID in a request.

The digital signage display 150 is a content display device for displaying digital media content data to the viewers. In certain embodiment, for displaying purposes, the digital signage display 150 is positioned at an area where the viewers may see the contents displayed on the digital signage display 150 without obstruction. In certain embodiment, the digital signage display 150 includes a controller and a display device. The controller is configured to receive the program list from the content manager module 137 and then accordingly request and download the contents specified in the program list from the content storage module 138. The controller displays the downloaded contents on the display device according to the program list. In certain embodiments, the controller periodically requests the program list from the content manager module 137. In certain embodiments, the management system 100 may include more than one digital signage display 150.

The remote management device 170 is a computing device for remote managing the service processor 110. A user may remotely connect to the service processor 110 from the remote management device 170 to change the settings of the service processor 110. In certain embodiments, the remote management device 170 may be a regular computer or a special purpose computer with wired or wireless network connectivity, such as a desktop computer or a laptop computer, or a mobile communication device, such as a smart phone or a tablet computer with wireless network connectivity.

The network 160 is a communication network connecting the service processor 110, the digital signage display 150, the demographic information server 130, the content server 133, and the remote management device 170. In certain embodiments, the network 160 may include wired or wireless network, and may be in the form of a mobile communication network, the Internet, the local area network (LAN), the wide area network (WAN), or a personal area network (PAN). The mobile communication network is a radio network system distributed over land areas called cells, and generally includes GSM, GPRS, HSPA, CDMA, WCDMA, WiMAX, LTE, satellite communication and many other mobile network systems. The PAN is a computer network system used for communication among computerized devices, which includes Wi-Fi, Zigbee, and Bluetooth networks. In certain embodiments, the network 160 is a cloud network.

Figure 4:
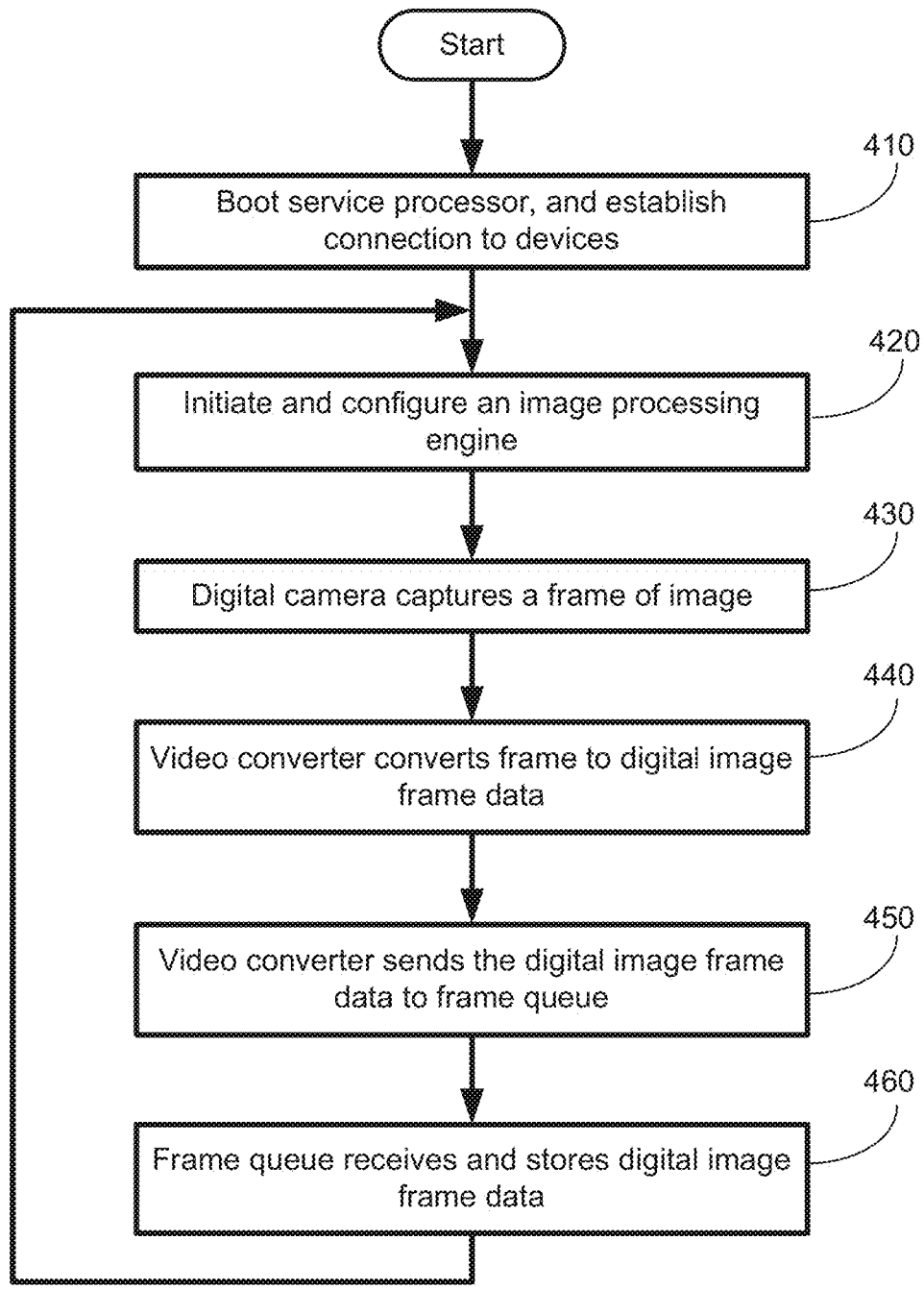
FIG. 4 shows an exemplary flow chart of a service processor processing captured image frames according to one embodiment of the present disclosure.

FIG. 4 shows an exemplary flow chart of the service processor capturing the image and generating the digital image frame data according to one embodiment of the present disclosure.

At operation 410, the service processor 110 is booted, and the firmware 120 is launched to establish connection to the devices, including the camera 140 and the network 160. The service processor 110 launches the camera controlling module 122, the video converter 123 and the demographic information collector 124. In certain embodiments, a user may remotely access the service processor 110 from the remote management device 170 via the network 160.

At operation 420, the image-processing-engine interface 125 of the demographic information collector 124 initiates one of the image processing engines (for example, the image processing engine 128), and sets up the configuration of the image processing engine 128.

At operation 430, the camera controlling module 122 of the service processor 110 controls the camera 140 to capture an image frame. The frame may include the viewers of the digital signage display 150 and other background images around the viewers.

Then, at operation 440, the video converter 123 of the service processor 110 converts the captured frame to digital image frame data. At operation 450, the video converter 123 sends the converted digital image frame data to the frame queue 127. At operation 460, the frame queue 127 receives and stores the digital image frame data.

Figure 5:
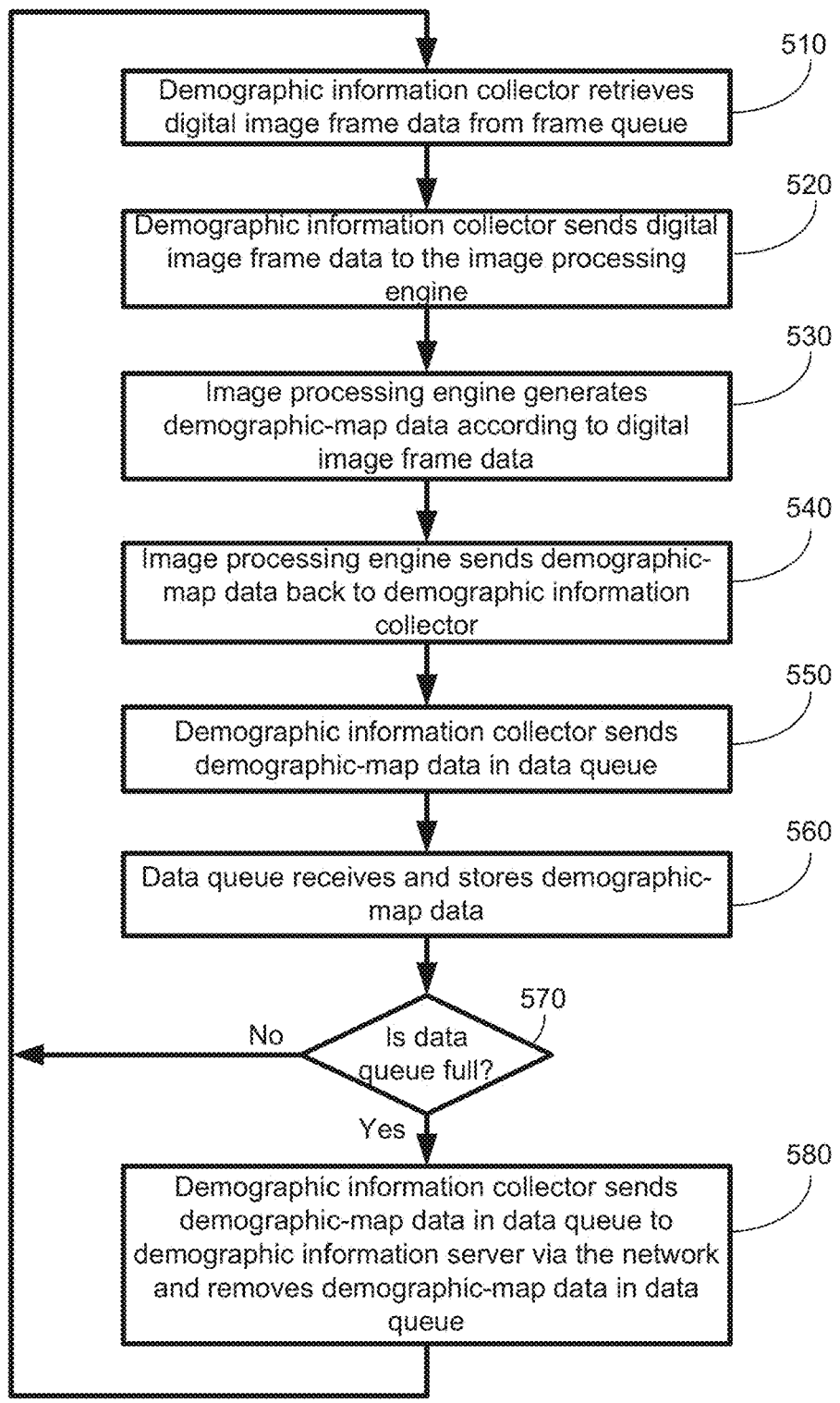
FIG. 5 shows an exemplary flow chart of a service processor processing the digital image frame data to generate the demographic-map data according to one embodiment of the present disclosure.

FIG. 5 shows an exemplary flow chart of the service processor processing the digital image frame data to generate the demographic-map data according to one embodiment of the present disclosure.

At operation 510, the demographic information collector 124 of the service processor 110 retrieves the digital image frame data of a frame from the frame queue 127. At operation 520, the demographic information collector 124 sends the retrieved digital image frame data to the image processing engine 128 for processing. At operation 530, the image processing engine 128 processes the digital image frame data and generates demographic-map data according to digital image frame data.

At operation 540, the image processing engine 128 sends back the demographic-map data back to the demographic information collector 124. At operation 550, the demographic information collector 124 sends the demographic-map data to the data queue 126. At operation 560, the data queue 126 receives and stores the demographic-map data.

At operation 570, the demographic information collector 124 periodically checks if the data queue 126 is full. When the data queue 126 is not full, the demographic information collector 124 goes back to operation 510 to retrieve the digital image frame data of another frame. When the data queue 126 is full, the demographic information collector 124 enters operation 580. At operation 580, the demographic information collector 124 sends the demographic-map data in the data queue 126 to the demographic information server 130 via the network 160, and removes the demographic-map data in the data queue 126.

On the demographic information server 130 side, when the demographic information server 130 receives the demographic-map data from the service processor 110 via the network 160, the demographic information server 130 stores the demographic information about time and location specified in the data structure in the data store 136. By storing demographic-map data structures continuously received from multiple service processors 110 at different locations, the demographic information server 130 eventually stores the demographic information at different locations and times. Further, the demographic information server 130 can process those data to identify any demographic patterns and trends.

On the content server 133 side, the content manager module 137 can request demographic information from the demographic information server 130 at the location of the signage and at a specific time period. Based on the demographic information received, the content manager module 137 can choose a content for the specific time period, and determine a program list for each digital signage display 150.

On the digital signage display 150 side, the digital signage display 150 may request the program list from the content manager module 137, and then accordingly request and download the contents specified in the program list from the content storage module 138. After downloading the contents, the digital signage display 150 displays the downloaded contents according to the program list.

The foregoing description of the example of the digital media management software has been presented only for the purposes of illustration and description and is not intended to be exhaustive or to limit the disclosure to the precise forms disclosed. Many modifications and variations are possible in light of the above teaching.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A digital signage display system, comprising:
a camera configured to capture an image frame;
a service processor in communication with the camera, the service processor comprising a processor, more than one network interface controller for performing network communications with different networks directly and a non-volatile memory storing a firmware, wherein the firmware is configured, when executed at the processor of the service processor, to
process the captured image frame;
detect persons in the image frame;
generate a demographic-map data structure, wherein the demographic-map data structure contains demographic information of the persons detected in the image frame and personal behavior data including duration at a scene of a person and attentiveness of the person, and wherein the attentiveness is determined by facing directions of the person in consecutive frames; and
send the demographic-map data structure to a server system; and
a digital signage display configured to receive a display content provided by the server system in response to the demographic-map data structure, the digital signage display comprising a display device,
wherein the server system comprises:
a demographic information server in communication with the service processor via a network, wherein the demographic information server, when executed at a processor of the server system, is configured to receive the demographic-map data structure from the service processor, to generate demographic information according to the demographic-map data structure, to identify demographic patterns and trends, and to predict times and locations at which demographic groups will be present based on the demographic patterns and trends, thus yielding predicted demographic information; and
a content server comprising a content manager module and a content storage module, wherein the content server is in communication with the service processor via the network and, when executed at a processor of the server system, is configured to request the demographic information from the demographic information server and to determine a program list to be displayed based on the predicted demographic information; wherein the content manager module manages contents to be displayed at each digital signage display and provides a uniform resource identifier for each specific content; and wherein the each digital signage display requests and downloads the each specific content from the content storage module by using the uniform resource identifier; and
wherein the content server, the service processor and the demographic information server are three wholly separate and distinct elements and the service processor is configured to send content management instructions directly to the content server to manage digital media content data stored in the content server;
wherein the firmware comprises a demographic information collector storing the digital image frame data to a frame queue, receiving the demographic-map data structure from one of at least two image processing engines, and sending the demographic-map data structure to the server system;
wherein the demographic information collector, when executed at the processor of the service processor, is configured to store the demographic-map data structure in a data queue, and when the data queue is full, to periodically send the demographic-map data structure in the data queue to the server system and periodically remove demographic-map data structure in the data queue; and
wherein each of the at least two image processing engines is executed at the processor of the service processor to perform different image processing algorithms, and is connected to the demographic information collector through an application programming interface (API).

2. The digital signage display system as claimed in claim 1, wherein the firmware comprises:
a camera control module, when executed at the processor of the service processor, configured to control the camera to capture the image frame;
a video converter, when executed at the processor of the service processor, configured to convert the image frame to digital image frame data,
wherein each of the image processing engines, when executed at the processor of the service processor, is configured to retrieve the digital image frame data from the frame queue, to generate the demographic-map data structure according to the digital image frame data, and to send the demographic-map data structure to the demographic information collector.

3. The digital signage display system as claimed in claim 2, wherein the demographic information collector comprises an image-processing-engine interface, wherein the image-processing-engine interface defines a function to configure the image processing engine collecting information in the demographic-map data structure.

4. The digital signage display system as claimed in claim 3, wherein the demographic-map data structure comprises personal attribute data, and wherein each of the image processing engines, when executed at the processor of the service processor, is configured to generate the personal attribute data by processing the digital image frame data corresponding to one image frame, and to generate the personal behavior data by comparing the personal attribute data corresponding to a plurality of image frames.

5. The digital signage display system as claimed in claim 1, wherein the content server, when executed at the processor of the server system, is configured to store the digital media content data, to generate the program list of the digital media content data according to the demographic information, and to send the program list as the display content to the digital signage display via the network.

6. The digital signage display system as claimed in claim 5, wherein the service processor is further configured to send demographic management instructions to the demographic information server to manage the demographic-map data structure stored in the demographic information server.

7. The digital signage display system as claimed in claim 1, wherein the demographic information server comprises a data store storing the demographic information.

8. The digital signage display system as claimed in claim 5, wherein the content server comprises:
the content storage module configured, when executed at the processor of the server system, to store the digital media content data; and the content manager module configured, when executed at the processor of the server system, to request the demographic information from the demographic information server, to generate the program list according to the demographic information, and to send the program list as the display content to the digital signage display via the network.

9. The digital signage display system as claimed in claim 5, wherein the network is a cloud network.

10. A non-transitory computer storage medium storing a firmware, wherein the firmware is configured, when executed at a processor of a service processor, to process an image frame captured by a camera;
detect persons in the image frame;
performing network communications of the service processor with different networks directly by more than one network interface controller of the service processor;
generate a demographic-map data structure, wherein the demographic-map data structure contains demographic information of the persons detected in the image frame and personal behavior data including duration at a scene of a person and attentiveness of the person, and wherein the attentiveness is determined by facing directions of the person in consecutive frames;
send the demographic-map data structure to a server system, wherein the server system comprises:
a demographic information server in communication with the service processor via a network, wherein the demographic information server, when executed at a processor of the server system, is configured to receive the demographic-map data structure from the service processor, to generate demographic information according to the demographic-map data structure, to identify demographic patterns and trends, and to predict times and locations at which demographic groups will be present based on the demographic patterns and trends, thus yielding predicted demographic information; and
a content server in communication with the service processor via the network, wherein the content server, the service processor and the demographic information server are three wholly separate and distinct elements,
wherein the content server, when executed at a processor of the server system, is configured to request the demographic information from the demographic information server, to send a display content to a digital signage display and to determine a program list to be displayed based on the predicted demographic information, wherein the digital signage display comprises a display device; and
send content management instructions from the service processor directly to the content server to manage digital media content data stored in the content server, wherein the content server comprises a content manager module and a content storage module;
the content manager module manages contents to be displayed at each digital signage display and provides a uniform resource identifier for each specific content; and the each digital signage display requests and downloads the each specific content from the content storage module by using the uniform resource identifier,
wherein the firmware comprises a demographic information collector storing the digital image frame data to a frame queue, receiving the demographic-map data structure from one of at least two image processing engines, and sending the demographic-map data structure to the server system;
wherein the demographic information collector, when executed at the processor of the service processor, is configured to store the demographic-map data structure in a data queue, and, when the data queue is full, to periodically send the demographic-map data structure in the data queue to the server system and to periodically send the demographic-map data structure in the data queue; and
wherein each of at least two image processing engines is executed at the processor of the service processor to perform different image processing algorithms, and is connected to the demographic information collector through an application programming interface (API).

11. The non-transitory computer storage medium as claimed in claim 10, wherein the firmware comprises:
a camera control module, when executed at the processor of the service processor, configured to control the camera to capture the image frame; and
a video converter, when executed at the processor of the service processor, configured to convert the image frame to digital image frame data,
wherein each of the image processing engines, when executed at the processor of the service processor, is configured to retrieve the digital image frame data from the frame queue, to generate the demographic-map data structure according to the digital image frame data, and to send the demographic-map data structure to the demographic information collector.

12. The non-transitory computer storage medium as claimed in claim 11, wherein the demographic information collector comprises an image-processing-engine interface, wherein the image-processing-engine interface defines a function to configure the image processing engine collecting information in the demographic-map data structure.

13. The non-transitory computer storage medium as claimed in claim 12, wherein the demographic-map data structure comprises personal attribute data, and wherein each of the image processing engines, when executed at the processor of the service processor, is configured to generate the personal attribute data by processing the digital image frame data corresponding to one image frame, and to generate the personal behavior data by comparing the personal attribute data corresponding to a plurality of image frames.

14. A computer-implemented method for managing a digital signage display system, comprising:
capturing, by a camera, an image frame, and sending the image frame to a service processor;
processing, at the service processor, the image frame;
detecting, at the service processor, persons in the image frame;
generating, at the service processor, a demographic-map data structure, wherein the demographic-map data structure contains demographic information of the persons detected in the image frame and personal behavior data including duration at a scene of a person and attentiveness of the person, and wherein the attentiveness is determined by facing directions of the person in consecutive frames;
performing network communications of the service processor with different networks directly by more than one network interface controller of the service processor;

sending the demographic-map data structure from the service processor to a demographic information server of a server system;

generating, by the demographic information server, demographic information according to the demographic-map data structure;

identifying, by the demographic information server, demographic patterns and trends, predicting, by the demographic information server, times and locations at which demographic groups will be present based on the demographic patterns and trends, thus yielding predicted demographic information, requesting, by a content server of the server system, the demographic information from the demographic information server, wherein the content server, the service processor and the demographic information server are three wholly separate and distinct hardware elements;

determining, by the content server of the server system, a program list to be displayed based on the predicted demographic information, receiving, by a digital signage display, a display content provided by the server system in response to the demographic-map data structure, wherein the digital signage display comprises a display device;

sending, by the service processor, content management instructions directly to the content server to manage digital media content data stored in the content server, wherein the content server comprises a content manager module and a content storage module; the content manager module manages contents to be displayed at each digital signage display and provides a uniform resource identifier for each specific content; and the each digital signage display requests and downloads the each specific content from the content storage module by using the uniform resource identifier;

storing the digital image frame data to a frame queue by a demographic information collector;

receiving the demographic-map data structure from one of at least two image processing engines by the demographic information collector; and sending the demographic-map data structure to the server system by the demographic information collector;

storing the demographic-map data structure in a data queue by the demographic information collector;

wherein, when the data queue is full, the demographic information collector periodically sends the demographic-map data structure in the data queue to the server system and periodically removes the demographic-map data structure in the data queue; and wherein each of the at least two image processing engines is executed at the service processor to perform different image processing algorithms, and is connected to the demographic information collector through an application programming interface (API).

15. The method as claimed in claim 14, further comprising:

converting the image frame to digital image frame data;

retrieving, by one of the image processing engines, the digital image frame data from the frame queue;

generating, at the one of the image processing engines, the demographic-map data structure according to the digital image frame data; and receiving, at the service processor, the demographic-map data structure from the image processing engine.

16. The method as claimed in claim 15, wherein the service processor comprises an image-processing-engine interface, wherein the image-processing-engine interface defines a function to configure the image processing engine collecting information in the demographic-map data structure.

17. The method as claimed in claim 16, wherein the demographic-map data structure comprises personal attribute data, and wherein each of the image processing engines is configured to generate the personal attribute data by processing the digital image frame data corresponding to one image frame, and to generate the personal behavior data by comparing the personal attribute data corresponding to a plurality of image frames.

* * * * *